(12) United States Patent
Barry et al.

(10) Patent No.: US 8,031,747 B2
(45) Date of Patent: Oct. 4, 2011

(54) APPARATUS AND METHOD OF COMPENSATING FOR CLOCK FREQUENCY AND PHASE VARIATIONS BY PROCESSING PACKET DELAY VALUES

(75) Inventors: Charles F. Barry, Santa Clara, CA (US); Meenakshi S. Subramanian, Santa Clara, CA (US); Feng Frank Pan, San Jose, CA (US); Tian (Alan) Shen, Cupertino, CA (US); Philip Kruzinski, Redwood City, CA (US); Guochun (George) Zhao, Cupertino, CA (US); DeviPrasad Natesan, Sunnyvale, CA (US); David R. Jorgensen, Santa Rosa, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 179 days.

(21) Appl. No.: 12/432,630

(22) Filed: Apr. 29, 2009

(65) Prior Publication Data
US 2010/0278055 A1  Nov. 4, 2010

(51) Int. Cl.
*H04J 3/06* (2006.01)
(52) U.S. Cl. .............. 370/516; 375/298; 375/371
(58) Field of Classification Search .......... 370/516–521; 375/226, 323, 371
See application file for complete search history.

(56) References Cited

U.S. PATENT DOCUMENTS

| | | | |
|---|---|---|---|
| 5,757,771 A | 5/1998 | Li et al. | |
| 5,790,543 A | 8/1998 | Cloutier | |
| 5,793,801 A * | 8/1998 | Fertner | 375/219 |
| 6,122,254 A | 9/2000 | Aydemir et al. | |
| 6,556,572 B1 | 4/2003 | Ishida | |
| 6,570,872 B1 | 5/2003 | Beshai et al. | |
| 6,647,428 B1 | 11/2003 | Bannai et al. | |
| 6,680,912 B1 | 1/2004 | Kalman et al. | |
| H2103 H | 5/2004 | Modiano | |
| 6,731,710 B1 * | 5/2004 | Genossar et al. | 375/362 |
| 6,741,559 B1 | 5/2004 | Smeulders et al. | |

(Continued)

FOREIGN PATENT DOCUMENTS

EP     0820173 A2     1/1998

(Continued)

OTHER PUBLICATIONS

Synchronization Services for NGN, Applications and deployment challenges. Cisco Systems, Inc. WSTS, Boulder, CO (Mar. 2007).

(Continued)

*Primary Examiner* — Ayaz Sheikh
*Assistant Examiner* — Mounir Moutaouakil
(74) *Attorney, Agent, or Firm* — Cooley LLP (57) ABSTRACT

An apparatus and method are described for compensating for frequency and phase variations of electronic components by processing packet delay values. In one embodiment, a packet delay determination module determines packet delay values based on time values associated with a first and a second electronic component. A packet delay selection module selects a subset of the packet delay values based on the maximum frequency drift of the first electronic component. A statistical parameter determination module evaluates a first and a second parameter based on portions of the subset of packet delay values A validation module validates the parameters when each portion the subset of packet delay values includes a minimum of at least two packet delay values. An adjustment module compensates for at least one of a frequency variation and a phase variation of the first electronic component based on the parameters if the parameters are both validated.

30 Claims, 6 Drawing Sheets

U.S. PATENT DOCUMENTS

| | | | |
|---|---|---|---|
| 6,865,149 | B1 | 3/2005 | Kalman et al. |
| 6,983,393 | B2 | 1/2006 | Truchard et al. |
| 7,230,952 | B2 | 6/2007 | Beshai |
| 7,251,256 | B1 | 7/2007 | Barry et al. |
| 7,260,102 | B2 | 8/2007 | Mehrvar et al. |
| 7,272,144 | B2 | 9/2007 | Cloonan et al. |
| 7,277,962 | B2 | 10/2007 | Zhang et al. |
| 7,295,604 | B2 * | 11/2007 | Cranford et al. ............. 375/226 |
| 7,583,705 | B2 * | 9/2009 | Sinha et al. ................... 370/503 |
| 7,590,061 | B2 | 9/2009 | Barry |
| 7,817,747 | B2 * | 10/2010 | Waheed et al. ............... 375/298 |
| 2002/0085582 | A1 | 7/2002 | Kim |
| 2003/0002539 | A1 | 1/2003 | Soda et al. |
| 2003/0137997 | A1 | 7/2003 | Keating |
| 2003/0185326 | A1 | 10/2003 | Kolze |
| 2004/0001493 | A1 | 1/2004 | Cloonan et al. |
| 2004/0196857 | A1 | 10/2004 | Holloway et al. |
| 2005/0100106 | A1 | 5/2005 | Chen |
| 2007/0147435 | A1 | 6/2007 | Hamilton et al. |
| 2007/0256078 | A1 | 11/2007 | Falk et al. |
| 2008/0089364 | A1 | 4/2008 | Barry et al. |
| 2008/0137691 | A1 | 6/2008 | Barry et al. |
| 2008/0198954 | A1 * | 8/2008 | Uribe et al. ................... 375/345 |
| 2009/0304032 | A1 * | 12/2009 | Florencio et al. ............. 370/516 |
| 2010/0158181 | A1 * | 6/2010 | Hadzic .......................... 375/371 |

FOREIGN PATENT DOCUMENTS

| | | |
|---|---|---|
| EP | 1349338 A2 | 10/2003 |
| WO | 2010/032454 | 11/2010 |

OTHER PUBLICATIONS

Paxson, et al. Wide-area traffic: the failure of Poisson modeling. IEEE/ACM Transactions on Networking, vol. 3 No. 3, 226-244 (Jun. 1995).

Paxson. End-to-end internet packet dynamics. IEE E/ACM Transactions on Networking, vol. 7, No. 3 (Jun. 1999).

Taqqu, et al. Estimators for long-range dependence: an empirical study (1995).

ITU-T Recommendation G.8261, Timing and Synchronization Aspects of IP Networks (May 2006).

Cosart, Timing measurements in packet networks, ITSF Conference (Nov. 2006) (http://www.telecom-sync.com/pdf/2006/24_Lee_Cosart.pdf).

Cosart, Precision packet delay measurements using IEEE 1588v2, Proc. 2007 Int. IEEE Sym. on Precision Clock Synchronization (ISPCS) for Measurement, Control and Communication, Vienna, Austria, pp. 85-91 (Oct. 2007).

Cosart, Active Packet Measurement Probe. Contribution to ITU-T Q13/SG15, Rome, Italy (Sep. 2008).

Cosart, Effects of different approaches to traffic generation on PDV. Contribution to ITU-T Q13/SG15, Rome, Italy (Sep. 2008).

Cosart et al., Definition of Band TDEV (bandTDEV), Contribution to ITU-T Q13/SG15, Rome, Italy (Sep. 2008).

Tonks, et al. Network metrics. Int'l Telecommunications Synch. Forum (ITSF) London (Nov. 2007).

Cosart, Studying network timing with precision packet delay measurements, 40$^{th}$ Ann. PTTI Conf (2008) http://www.pttimeeting.org/archivemeetings/2008papers/paper17.pdf.

Mills, Internet Time Synchronization: The Network Time Protocol, IEEE Transactions on Communications, vol. 39, No. 10 (Oct. 1991) (http://networks.cs.ucdavis.edu/~mukherje/289i_sq08/mills-ntp-tcom-oct91.pdf).

Leland, et al., On the self-similar nature of ethernet traffic (extended version). IEEE/ACM Transactions on Networking, vol. 2, No. 1 (Feb. 1994).

Symmetricom, Definition of minimum TDEV (minTDEV). Int'l Telecomm. Union (ITU), Telecommunication Standardization Sector, COM 15-C-363-E, 7 pp. (May 2007).

Bregni, Synchronization of digital telecommunications networks: Ch. 1.1.5-1.1.8 (pp. 11-16); Ch. 4.2-4.2.6 (pp. 145-150); Ch. 5.8-5.8.10 (pp. 239-270); Ch. 7.7 (pp. 339-370) J. Wiley & Sons Ltd. (2002).

Barry, "Carrier-class synchronization across the NGN wireless backhaul." NIST/ATIS (National Institute of Standards and Technology) Workshop on Synchronization in Telecommunications Systems, Broomfield, Colorado, Mar. 13-15, 2007.

* cited by examiner

APPARATUS AND METHOD OF COMPENSATING FOR CLOCK FREQUENCY AND PHASE VARIATIONS BY PROCESSING PACKET DELAY VALUES

FIELD OF THE INVENTION

The present invention relates generally to processing of packet traffic in computer networks. More particularly, this invention is directed towards compensating for clock frequency and phase variations by processing packet delay values.

BACKGROUND OF THE INVENTION

In recent years, there has been a rapid increase in demand for delivery of real-time applications and services in computer networks, including Pseudo-Wire Emulation (PWE), Voice over IP (VoIP), video conferencing, and broadcast, multicast and many cast streaming services such as H.261, H.323, and IPTV. These real-time services typically require highly accurate timing to ensure high service quality. Highly accurate timing is also required at base stations in wireless networks based on technologies such as Global System for Mobile communications (GSM), Code Division Multiple Access (CDMA), WiMAX, and Long Term Evolution (LTE).

To ensure high service quality and to facilitate network management, it is desirable to eliminate clock mismatch between computer network equipment such as switches, routers, and base stations. This can be done by providing a highly accurate timing reference at each node, such as a Global Positioning System (GPS) reference or a lower quality oscillator such as a Stratum 2 rubidium oscillator, where the specification for Stratum 2 clock quality is given in Telcordia GR-1244-CORE. However, at the same time it is desirable to reduce the substantial cost resulting from per-node deployment of these timing references.

To reduce per-node cost, it is desirable to use a cheaper oscillator, such as an oven controlled crystal oscillator (OCXO) or a temperature controlled oscillator (TCXO), at each client node. However, OCXO's and TCXO's may be unable to meet Stratum 2 clock quality requirements, or the corresponding clock quality requirements for wireless networks defined in ITU-T G.823 SEC, 3GPP, and IEEE 802.16e. To solve this problem, one or more clock servers may provide timing through a data network to each client node. Each clock server may obtain timing derived from a Stratum 1 reference, such as the Global Positioning System (GPS) or a primary reference source locked to GPS.

One of the important factors that limits the accuracy of timing distribution in packet networks is variations in network delay, known as jitter or packet delay variation (PDV), experienced by timing packets sent between a clock server and client nodes. A primary source of jitter is the multiplexing of timing packets with other packet traffic. The timing accuracy of the timing distribution protocol Network Time Protocol version 4 (NTPv4) over the public Internet may be on the order of 10 milliseconds; in local area networks, the timing accuracy of NTPv4 may be better, on the order of hundreds of microseconds. However, the timing accuracy of conventional NTPv4 appears to be insufficient for distribution of Stratum 2 quality timing.

One approach to enhancing the accuracy of timing distribution in packet networks is to use special approaches to minimize the jitter affecting timing packets sent between the clock server and the client nodes. To meet the above-described clock quality requirements, these special approaches typically must go beyond simply assigning timing packets to a highest priority class of service, such as Expedited Forwarding (EF), as defined by the Internet Engineering Task Force (IETF) Differentiated Services Working Group. An example is controlled delay packet forwarding, described in Barry et al., "Apparatus and Method of Controlled Delay Packet Forwarding," U.S. Ser. No. 11/843,493, filed on Aug. 22, 2007. However, to meet the above-described clock quality requirements, each switch and/or router traversed by timing packets often must support one or more of these approaches.

It is therefore desirable to determine how to enhance the accuracy of timing distribution in packet networks without imposing special requirements on each switch and/or router traversed by timing packets sent between a clock server and client nodes. In particular, it is desirable to determine how to achieve this enhancement in accuracy via processing at the client nodes of delay values associated with the timing packets.

SUMMARY OF THE INVENTION

An apparatus and method are described that compensate for at least one of a frequency variation and a phase variation of a first electronic component relative to a second electronic component by processing packet delay values. One embodiment of the invention includes a packet delay determination module, a packet delay selection module, a statistical parameter determination module, a validation module, and an adjustment module. The packet delay determination module determines each of a plurality of packet delay values based on time values associated with the first electronic component and the second electronic component. The packet delay selection module selects a subset of the plurality of packet delay values based on the maximum frequency drift of the first electronic component. The statistical parameter determination module evaluates a first parameter based on a first portion of the subset of packet delay values, and a second parameter based on a second portion of the subset of packet delay values. The validation module validates the first parameter and the second parameter when the first portion and the second portion of the subset of packet delay values each include a minimum number of packet delay values, where the minimum number is at least two. The adjustment module compensates for at least one of the frequency variation and the phase variation of the first electronic component based on the first parameter and the second parameter if the first parameter and the second parameter are both validated.

A further embodiment of the invention compensates for a frequency variation of a first electronic component relative to a second electronic component by processing packet delay values. This embodiment includes a packet delay determination module, a statistical parameter determination module, a timing packet loss detection module, a validation module, and an adjustment module. The packet delay determination module determines each of a plurality of packet delay values based on time values associated with the first electronic component and the second electronic component. The statistical parameter determination module evaluates a first maximum of a first portion of the packet delay values, and a second maximum of a second portion of the packet delay values, where each of the first portion and the second portion of the packet delay values is associated with a time window. The timing packet loss detection module detects a loss of a first timing packet including a first identifier based on failure to receive any timing packet including the first identifier within the time window. The validation module validates the first maximum and the second maximum when: (1) the first portion and the second portion of the subset of packet delay values each include a minimum number of packet delay values, where the minimum number is at least two; (2) each of the first maximum and the second maximum is within a tolerance of a maximum delay parameter; and (3) a minimum number of timing packets are detected as lost within the time window. The adjustment module compensates for the frequency variation of the first electronic component based on the first parameter and the second parameter if the first maximum and the second maximum are both validated.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
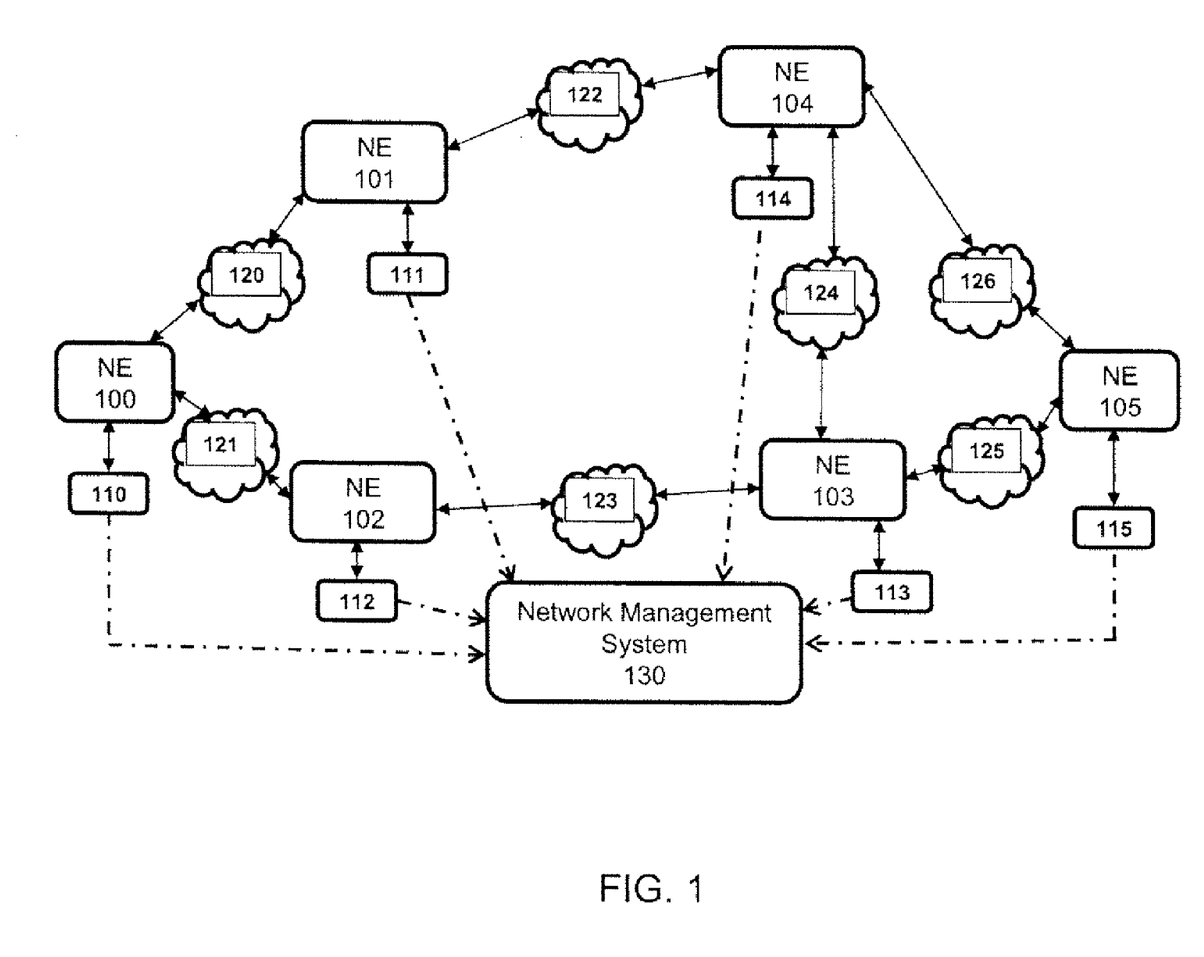
FIG. 1 illustrates a network architecture including a time server that provides timing information to client devices, in accordance with one embodiment of the present invention.

FIG. 1 illustrates a network architecture including a time server 100 that provides timing information to client devices 101, 102, 103, 104, and 105, in accordance with one embodiment of the present invention. The time server 100 obtains timing from a master clock source 110. The time server 100 may alternatively be referred to as the clock master 100. The master clock source 110 may be a Stratum 1 referenced clock source, such as a primary reference clock derived from the Global Positioning System (GPS). The client devices 101, 102, 103, 104, and 105 include and obtain timing from local client clocks 111, 112, 113, 114, and 115, respectively. The client devices 101-105 may alternatively be referred to as the slaves 101-105. A network management system 130 monitors the time server 100 and the client devices 101-105. The network management system 130 may communicate with the time server 100 and the client devices 101-105 using a network management protocol such as the Simple Network Management Protocol (SNMP). The network management system 130 generates timing-related alarm notifications such as loss of timing reference, loss of lock, and local clock entering holdover.

The local client clocks 111-115 are adjusted by the client devices 101-105 at least in part based on the timing information provided by the time server 100. The timing information may be provided in the form of timing packets that travel between the time server 100 and one or more of the client devices 101-105. These timing packets may traverse one or more of packet networks 120, 121, 122, 123, 124, 125, and 126.

The timing packets may be generated using a timing distribution protocol such as the Network Time Protocol (NTP) or the IEEE 1588 Precision Time Protocol (PTP). In one embodiment, each client device 101-105 may originate timing packets that are sent to the time server 100, then are returned by the time server 100 to each client device 101-105. In another embodiment, the time server 100 may originate one or more types of timing packets that are sent to each client device 101-105, and each client device may originate one or more other types of timing packets that are sent to the time server 100.

In FIG. 1, timing information can travel between the time server 100 and each client device 101-105 over multiple paths. For example, timing packets traveling between the time server 100 and the client 101 may normally traverse network 120. However, these timing packets may instead traverse networks 121, 123, 124, and 122 when traveling between the time server 100 and the client 101. Alternatively, these timing packets may traverse networks 121, 123, 125, 126, and 122 when traveling between the time server 100 and the client 101. These timing packets may take one or more of these alternate paths if there is a failure in network 120 that prevents these timing packets from traversing network 120. Alternatively, these timing packets may take one or more of these alternate paths in response to configuration commands from the network management system 130.

Figure 2:
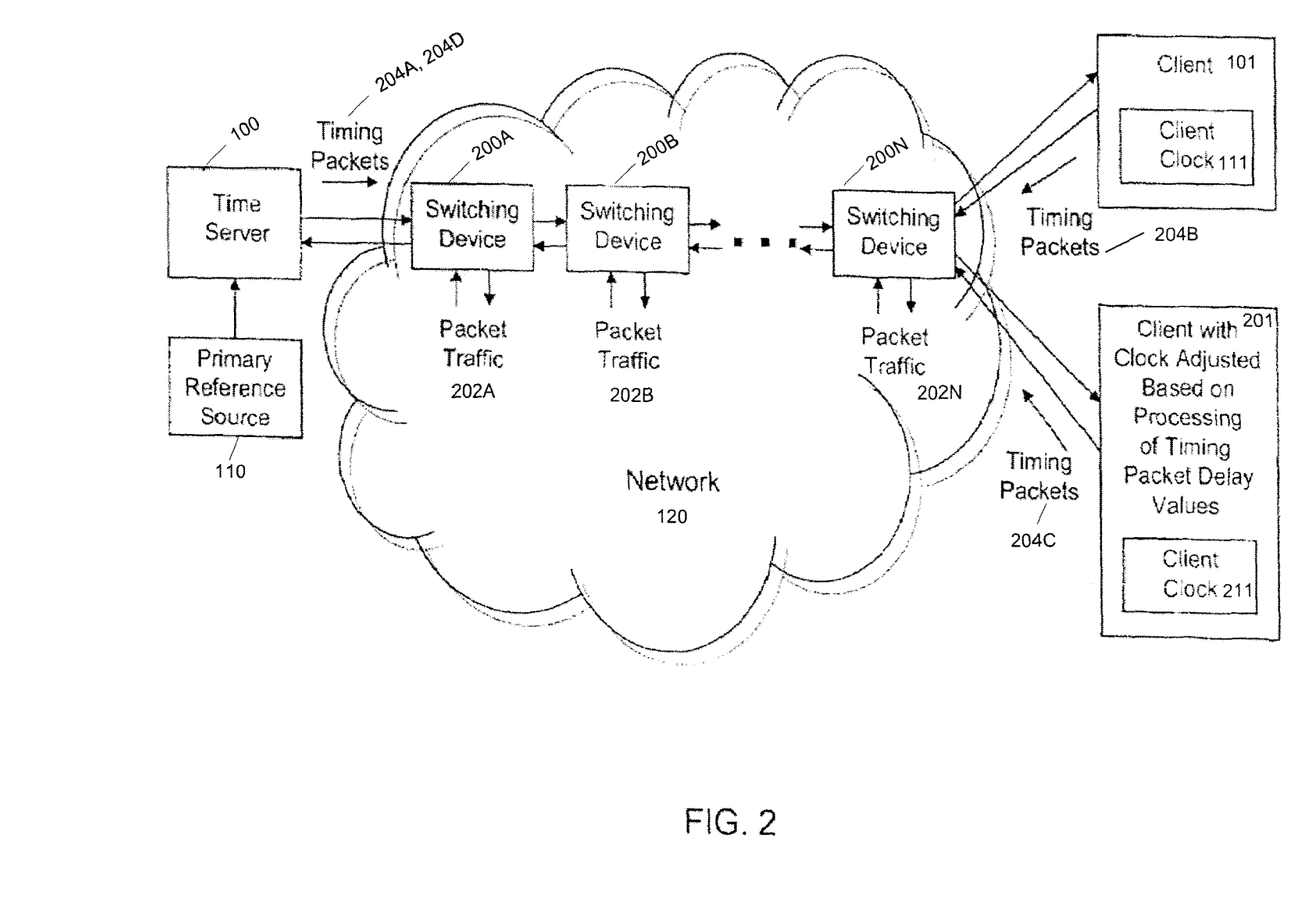
FIG. 2 illustrates a portion of the network architecture of FIG. 1 including switching devices traversed by timing packets traveling between the time server and the client devices, in accordance with one embodiment of the present invention.

FIG. 2 illustrates a portion of the network architecture of FIG. 1 including switching devices 200A-200N traversed by timing packets 204A-204D traveling between the time server 100 and the client devices 101 and 201, in accordance with one embodiment of the present invention. A single type of timing packet 204A may be sent by the time server 100 to each of the client devices 101 and 201. Alternatively, multiple types of timing packets 204A and 204D may be sent by the time server 100 to the client devices 101 and 201. Each timing packet 204A and 204D may be sent by the time server 100 to either client device 101, or to client device 201.

The client device 201 includes a client clock 211 that is adjusted based on processing of packet delay values, in accordance with one embodiment of the present invention. At each switching device 200, the timing packets 204 contend with packet traffic 202 traveling between switching devices 200. The packet traffic 202 may include data packets and control packets. The timing packets 204 may be assigned to a higher class of service than the data packets. For example, the timing packets 204 may be assigned to the Expedited Forwarding (EF) class while the data packets may be assigned to the Assured Forwarding (AF) and/or the Best Effort (BE) classes as defined by the Internet Engineering Task Force (IETF) Differentiated Services Working Group. In this example, the EF, AF, and BE classes have a strict priority relationship, as will be understood by one of ordinary skill in the art. The control packets may be assigned to EF class, or to a pre-emptive priority class that is of higher priority than EF class. The pre-emptive priority class and the EF class may also have a strict priority relationship. The control packets may include other timing packets, such as timing packets traveling through network 120 between a different time server and a different client.

Even if the timing packets 204 are in a high priority class such as EF, the timing packets 204 may experience significant high-frequency delay variations, or jitter, due to packet traffic 202 transmitted by switching devices 200 ahead of the timing packets 204. For example, if transmission of a data packet in AF or BE class is in progress when timing packet 204 in EF class becomes ready for transmission, the timing packet 204 typically must wait for the in-progress transmission to complete before being transmitted. Also, if transmission of a control packet is in progress when timing packet 204 in EF class becomes ready for transmission, the timing packet 204 also must wait for the in-progress transmission to complete before being transmitted. The timing packet 204 may also interact with other timing packets in EF class. This may occur, for example, if there are a large number of clients in the network transmitting timing packets at the same or similar times. These types of variable delays are a primary source of the jitter experienced by the timing packets 204. If bursts of control packets in a pre-emptive priority class are transmitted by switching device 200 ahead of timing packets 204, this may further increase the jitter experienced by the timing packets 204, though this additional increase in jitter may be controlled by policing and/or shaping the traffic in the pre-emptive priority class.

If the jitter experienced by the timing packets 204 is sufficiently large, the timing packets 204 may overflow buffers in the switching devices 200 and be lost. Even if the jitter experienced by the timing packets 204 is not large enough to cause packet loss, the jitter may degrade the quality of the timing that the client 101 derives from the timing packets 204. For example, if the timing packets 204 do not experience jitter due to packet traffic 202, then small timing packet delay variations due to frequency and/or phase variations between the master clock source 110 and the client clock 111 may be clearly visible to the client 101, enabling the client 101 to adjust the frequency and/or phase of the client clock 111 to correspond to the master clock source 110. However, the jitter due to packet traffic 202 may obscure these small timing packet delay variations. For example, the jitter due to packet traffic 202 may be on the order of microseconds to milliseconds, while the small timing packet delay variations due to frequency and/or phase variations between the master clock source 110 and the client clock 111 may be on the order of tens of nanoseconds. If the client 101 attempts to directly use time information corrupted by jitter due to packet traffic 202 to adjust the client clock 111, the resulting quality of the timing provided by the client clock 111 may not meet clock quality requirements such as for Stratum 2, as defined by Telcordia CR-1244-CORE, or for base stations in macrocells and femtocells, as defined by ITU-T G.823 SEC, 3GPP, IEEE 802.16e (WiMAX), and other published wireless standards.

In accordance with one embodiment of the invention, the client 201 may process packet delay values associated with timing packets 204. The packet delay values may be divided into portions, where each portion of the packet delay values is associated with a path through network 120, a direction, and a time period (or time window or observation window). For example, packet delay values associated with timing packets 204A and 204D transmitted by the time server 100 to the client 201 are associated with a bidirectional path that traverses switching devices 200A-200N, and the incoming direction to the client 201. Packet delay values associated with timing packets 204C transmitted by the client 201 to the time server 100 are associated with the same bidirectional path, and the outgoing direction from the client 201. Time windows over which a portion of packet delay values are collected may range from a time window as short as 10 seconds to a time window of tens of days.

One objective of the processing of packet delay values by the client 201 is to evaluate parameters corresponding to each portion of the packet delay values, where the value of these parameters is stable across portions of the packet delay values. In particular, to be stable the value of these parameters should vary within approximately 2 microseconds or less (within ±2 microseconds) for OCXO's and within approximately 20 microseconds or less (within ±20 microseconds) for TCXO's. The variation of these parameters includes both variations in the client clock 211 relative to the master clock source 110 and variations due to significant variations in the volume, or loading, of packet traffic 202 across time windows over which portions of the packet delay values are collected. When stable, these parameters should vary primarily due to variations in the client clock 211 relative to the master clock source 110, and little or not at all due to the jitter experienced by the timing packets 204 due to the variations in the packet traffic 202. As a result, when these parameters are used by the client 201 to adjust the client clock 211, the quality of the client clock 211 may be enhanced.

The total variation in the loading of packet traffic 202 over a 24-hour period may be large, from high loading during peak usage hours to light loading during hours with the lowest usage. The parameters described above are typically stable for pair of each 24-hour period, but not for the entire 24-hour period. Stability may be characterized with reference to the slow traffic modulation test configuration of ITU-T G.8261. In this test case, the incoming packet traffic 202 to each of five switching devices 200A-200E increases linearly from 20% to 80% over a twelve hour period, then decreases linearly from 80% to 20% over the subsequent twelve hour period, then repeats. Using this test configuration, a parameter such as the minimum of a portion of packet delay values measured over 64 or 128 second intervals may be stable for time windows corresponding to load values less than 50-60%, but possibly not for larger load values. For load values larger than 50-60%, the effect of variations in the packet traffic 202 may result in variations in the value of the minimum that exceed ±2 microseconds or less for OCXO's or ±20 microseconds or less for TCXO's. On the other hand, a parameter such as the maximum of a portion of packet delay values measured over 64 or 128 second intervals may be stable for time windows corresponding to load values greater than 50-60%.

The part of each 24-hour period over which a parameter is stable may depend on the length of the time window over which the portion of packet delay values is measured. For example, the minimum of a first portion of packet delay values measured over a time window of several hours may be stable more often than the minimum of a second portion of packet delay values measured over a time window of 64 or 128 seconds. This is because for a longer measurement period, it may be more likely that a timing packet 204 will pass through the network without being delayed by the packet traffic 202, or that the traffic load corresponding to the packet traffic 202 will decrease sometime during the measurement period so that the minimum becomes stable.

In one embodiment, these parameters may include but are not limited to the minimum, the mean, the median, the mode, and the maximum of a portion of packet delay values. These parameters may also correspond to the positions of slopes, peaks, and troughs in the probability distribution function of the portion of packet delay values. The position of the slope may be measured by the position of the midpoint of the slope, or by when the slope crosses a probability density threshold.

Another objective of the processing of packet delay values by the client 201 is to reduce the impact of jitter experienced by timing packets 204. In one embodiment, this may be done by selecting a subset of the packet delay values to exclude packet delay values that cannot correspond to frequency and/or phase variations of the client clock 211 relative to the clock master 110. For example, the subset of the packet delay values may be selected based on the maximum frequency drift of the client clock 211. The maximum frequency drift may correspond to the maximum output frequency $f_{max}$ of an oscillator. Each packet delay value may be compared to a maximum packet delay threshold. In one embodiment, the maximum packet delay threshold may be determined based on a "golden" measured packet delay value $T_{golden}$ from the time server 100 to the client 201. $T_{golden}$ may be the minimum of a portion of the packet delay values measured during a time window when the estimated loading of packet traffic 202 is low. Then a packet delay value measured at time interval $\Delta T$ after $T_{golden}$ was measured should be no greater than approximately $T_{golden} + \Delta T * (f_{max}/f_{server} - 1)$, where $f_{server}$ is the estimated frequency of the clock master 110 determined by the client 201. The value of $\Delta T$, and thus of the maximum packet delay threshold, may be updated based on updated measurements of $T_{golden}$. For example, an OCXO may have a maximum $(f_{max}/f_{server} - 1)$ of 10 parts per billion (ppb). In this case, for a $\Delta T$ of 128 seconds, then the maximum packet delay threshold may be set at 1.28 microseconds. Alternatively, a TCXO may have a maximum $(f_{max}/f_{server} - 1)$ of 100 parts per billion (ppb). In this case, for a $\Delta T$ of 128 seconds, then the maximum packet delay threshold may be set at 12.8 microseconds.

In one embodiment, the maximum packet delay threshold may be decreased based on a history of the estimated output frequencies of the client clock 211. By excluding packet delay values that cannot correspond to frequency and/or phase variations of the client clock 211 relative to the clock master 110, the effect of the jitter experienced by timing packets 204 on parameters such as the mean is reduced. As a result, when these parameters are used by the client 201 to adjust the client clock 211, the quality of the client clock 211 may be enhanced.

In one embodiment, the impact of jitter experienced by timing packets 204 may also be reduced by weighting parameters corresponding to each portion of the packet delay values. For example, a network may experience heavier loading on the incoming direction from time server 100 to client 201 than on the outgoing direction from client 201 to time server 100. It may therefore be more likely that a parameter, such as a minimum, corresponding to a first portion of packet delay values associated with the outgoing direction is stable compared to the minimum of a second portion of packet delay values associated with the incoming direction. In this example, the parameter associated with the outgoing direction may be assigned a higher weight than the parameter associated with the incoming direction. Alternatively, for a parameter such as a maximum, the parameter associated with the incoming direction in this example may be assigned a higher weight than the parameter associated with the outgoing direction. The weight may assume any value between zero and one inclusive. The client 201 may use the weight to exclude parameters corresponding to one or more portions of the packet delay values associated with a path, a direction, and/or a time window. For example, the client 201 may use only parameters associated with the incoming direction by assigning a weight of one to all parameters associated with the incoming direction, and by assigning a weight of zero to all parameters associated with the outgoing direction. Therefore, by using weights to emphasize more reliable parameters over less reliable parameters, the quality of the client clock 211 may be enhanced.

Using embodiments of the invention, the client clock 211 may be adjusted based on timing packets 204 to meet Stratum 2, macrocell, or femtocell clock quality requirements. As a result, the client clock may be an OCXO or a TCXO, each of which is less expensive than a rubidium oscillator. The switching devices 200 traversed by the timing packets 204 also may be conventional packet switches, and need not support packet jitter reduction techniques such as controlled delay packet forwarding.

Figure 3:
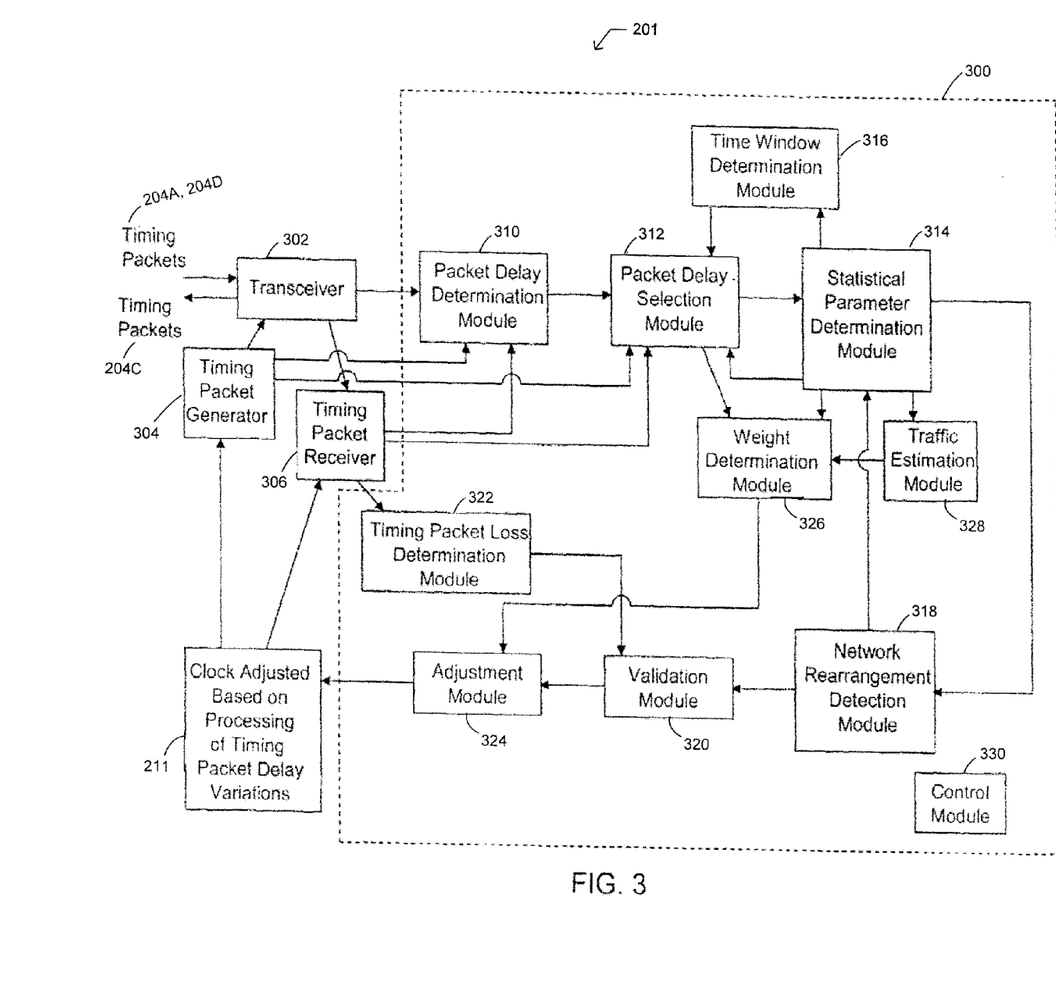
FIG. 3 illustrates a logical block diagram of the main functional blocks of the client device, including the module for clock adjustment based on processing of timing packet delay values, in accordance with one embodiment of the present invention.

FIG. 3 illustrates a logical block diagram of the main functional blocks of the client device 201, including module 300 for clock adjustment based on processing of timing packet delay values, in accordance with one embodiment of the present invention. The module 300 compensates for frequency variation and/or phase variation of the client clock 211 relative to the server clock 110. In addition to the module 300, the client device 201 includes a transceiver 302, a timing packet generator 304, a timing packet receiver 306, and the client clock 211. The transceiver 302 transmits and receives timing packets 204, data packets, and control packets. The timing packet generator 304 generates timing packets 204C. The timing packet generator 304 may provide transmission times of the timing packets 204C to packet delay determination module 310. The timing packet generator 304 may also provide path, direction, and time information associated with at least a portion of the transmitted timing packets to packet delay selection module 312. The timing packet generator 304 may generate timing packets 204C on a periodic or aperiodic basis. Alternatively, the timing packet generator 304 may be triggered to generate a timing packet 204C based on reception of a timing packet 204A from the time server 100. The timing packet receiver 306 receives timing packets 204A. The timing packet receiver 306 may provide reception times of the timing packets 204A to the packet delay determination module 310. The timing packet receiver may also provide timing information included in fields of the timing packets 204A to the packet delay determination module 310. For example, the timing packets 204A may include timestamp information inserted by the client device 201 and by the time server 100. The timing packet receiver 306 may also provide path, direction, and time information associated with at least a portion of the received timing packets to packet delay selection module 312.

In one embodiment, a timing packet 204C is originated by the client 201. The transmission time of the timing packet 204C is determined by the timing packet generator 304 based on the client clock 211. At the time server 100, the reception time of the timing packet 204C based on the clock master 110 is inserted as a field in the timing packet 204C. The timing packet 204C is then looped back, and transmitted by the time server 100 as a timing packet 204A. The transmission time of the timing packet 204A based on the clock master 110 is also inserted as a field in the timing packet 204A by the time server 100. Upon receipt of the timing packet 204A at the client 201, the reception time of the timing packet 204A is determined by the timing packet receiver 306 based on the client clock 211. In this embodiment, the timing packet 204D is not used.

In another embodiment, a first timing packet 204A is originated by the time server 100. The transmission time of the first timing packet 204A based on the clock master 110 is inserted as a field in the first timing packet 204A by the time server 100. Upon receipt of the first timing packet 204A at the client 201, the reception time of the first timing packet 204A is determined by the timing packet receiver 306 based on the client clock 211. A second timing packet 204C is originated by the client 201. The transmission time of the second timing packet 204C is determined by the timing packet generator 304 based on the client clock 211, and is inserted as a field in the second timing packet 204C by the client 201. Upon receipt of the second timing packet 204C at the time server 100, the reception time of the second timing packet 204C is determined by the time server 100 based on the clock master 110. A third timing packet 204D is then originated by the time server 100. The time server 100 inserts the transmission time and the reception time of the second timing packet 204C as fields in the third timing packet 204D. The third timing packet 204D is then sent to the client 201.

In one embodiment, the packet delay determination module 310 determines packet delay values associated with the timing packets 204 based on time values provided by timing packet generator 304 and timing packet receiver 306. The packet delay selection module 312 may select a subset of the packet delay values provided by packet delay determination module 310. The packet delay selection module 312 may also associate portions of the packet delay values with paths, directions, and/or time windows based on input from the timing packet generator 304, the timing packet receiver 306, and the time window determination module 316. The statistical parameter determination module 314 may evaluate parameters based on the portions of packet delay values provided by packet delay selection module 312. The time window determination module 316 determines time window information, such as start time, stop time, and time duration. The time window determination module 316 may provide the time window information to the packet delay selection module 312 and to the control module 330. The control module 330 may use this information to control the generation of timing packets 204C by the timing packet generator 304.

In one embodiment, the weight determination module 326 weights parameters determined by the statistical parameter determination module 314. The traffic estimation module 328 estimates traffic loading levels of packet traffic 202 that jitters the timing packets 204 based on parameters determined by the statistical parameter determination module 314. The traffic loading estimates may be associated with a path, a direction, and/or a time window.

In one embodiment, the network rearrangement detection module 318 detects a network rearrangement based on parameters provided by the statistical parameter determination module 314.

In one embodiment, the validation module 320 validates parameters generated by the statistical parameter determination module 314. Alternatively, the validation module 320 may validate other parameters derived from parameters provided by the statistical parameter determination module 314. For example, as described earlier, the statistical parameter determination module 314 may determine a first parameter based on a first portion of the packet delay values, and a second parameter based on a second portion of the packet delay values. A time offset may be derived based on the first parameter and the second parameter, such as by taking the difference between the first parameter and the second parameter. This time offset may be validated by the validation module 320. The timing packet loss determination module 322 detects loss of a timing packet 204 including a first identifier, such as a sequence number, and may provide related information to the validation module 320.

In one embodiment, the adjustment module 324 compensates for at least one of frequency variation and phase variation of the client clock 211 relative to the server clock 110 based on parameters validated by the validation module 320. The adjustment module 324 may weight parameters based on weights provided by the weight determination module 326.

In one embodiment, the control module 330 may configure, monitor, and/or collect data from any of the submodules illustrated in FIG. 3. This information may be communicated using SNMP to a network management system where the information may be further processed.

Figure 4:
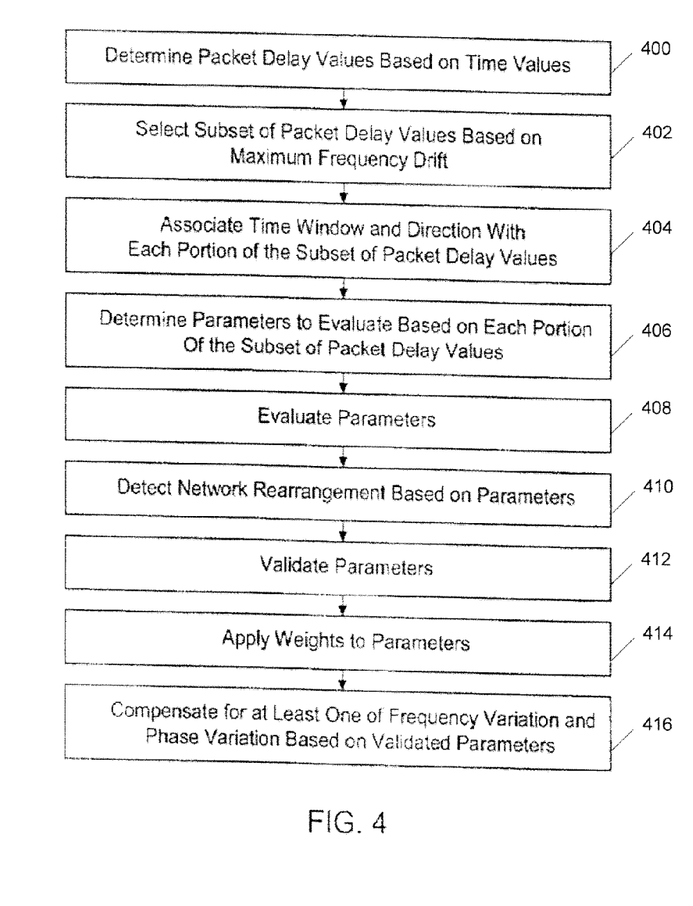
FIG. 4 illustrates operations associated with the processing of timing packet delay values to compensate for at least one of a frequency variation and a phase variation of an electronic component, in accordance with one embodiment of the present invention.

FIG. 4 illustrates operations associated with the processing of timing packet delay values to compensate for at least one of a frequency variation and a phase variation of an electronic component, in accordance with one embodiment of the present invention. The packet delay determination module 310 determines packet delay values based on time values provided by the timing packet generator 304 and the timing packet receiver 306 (block 400). Each packet delay value may be computed based on a first time value measured using the clock master 110, and a second time value measured using the client clock 211. In one embodiment, the packet delay determination module 310 determines the difference between the reception time and the transmission time associated with each timing packet 204. As described earlier, a timing packet 204C may be generated at the client 201 and looped back at the time server 100. In this case, there may be a first transmission time and a first reception time associated with the outgoing direction (from the client 201 to the time server 100), and a second transmission time and a second reception time associated with the incoming direction (from the time server 100 to the client 201). As a result, there may be multiple packet delay values determined from reception times and transmission times associated with a single timing packet 204C.

One embodiment, the packet delay selection module 312 then selects a subset of the packet delay values based on the maximum frequency drift of the client clock 211 (block 402). The maximum frequency drift may correspond to the maximum output frequency of an oscillator such as an OCXO or a TCXO, and may depend on the application. For example, an OCXO may have a maximum frequency drift that is within 10 ppb of the center frequency of the OCXO, while a TCXO may have a maximum frequency drift that is within 250 ppb of the center frequency of the TCXO. The TCXO may be suitable for applications with looser frequency synchronization requirements, while the OCXO may be suitable for applications with more stringent frequency synchronization requirements. As described earlier, the packet delay selection module 312 may select a subset of the packet delay values to exclude packet delay values that cannot correspond to frequency and/or phase variations of the client clock 211 relative to the clock master 110. For example, each packet delay value may be compared to a maximum packet delay threshold that is determined based on the maximum frequency drift. Each packet delay value that exceeds the maximum packet delay threshold may be discarded. The packet delay selection module 312 may determine a selection percentage that indicates the percentage of the packet delay values selected to be in the subset of packet delay values.

The packet delay selection module 312 may determine the maximum packet delay threshold based on time information provided by the statistical parameter determination module 314. For example, the statistical parameter determination module 314 may provide $T_{golden}$, the minimum of a portion of the packet delay values measured during a time window when the estimated loading of packet traffic 202 is low. The packet delay selection module 312 may then determine the maximum packet delay threshold based on $T_{golden}$, as described earlier. The statistical parameter determination module 314 may re-determine $T_{golden}$ after a network rearrangement, as described below. Alternatively, the statistical parameter determination module 314 may re-determine $T_{golden}$ if no packet delay values have been selected by the packet delay selection module 312 for a time period of, for example, 32 minutes.

In another embodiment, the packet delay selection module 312 may not select the subset of the packet delay values based on the maximum frequency drift of the client clock 211. For example, if the statistical parameter determination module 314 determines the maximum of portions of the packet delay values, then it may be desirable to preserve the largest packet delay values. These packet delay values may exceed the maximum packet delay threshold that is determined based on the maximum frequency drift. In this embodiment, packet delay values that exceed the maximum packet delay threshold are not discarded.

In one embodiment, the packet delay selection module 312 associates a time window and a direction with each portion of the subset of packet delay values (block 404). The packet delay selection module 312 may also associate path information with each portion of the subset of packet delay values. The packet delay selection module 312 may obtain direction and/or path information from the timing packet receiver module 306. The direction and/or path information may be obtained based on fields in the timing packets 204C and/or configuration information set by the control module 330. The time window refers to a period of time during which each value within a portion of the subset of packet delay values is measured. As described earlier, the time window determination module 316 may determine the start time, the stop time, and the time duration (or length) of the window. Alternatively, the start time of the window may be determined by the control module 330 and the window length may be determined by the time window determination module 316. Time windows for different portions of the subset of packet delay values may overlap, or may not overlap. The time window determination module 316 may determine the window length for a time window based on a parameter evaluated by the statistical parameter determination module 314, such as a standard deviation, a variance, and/or a higher-order moment evaluated based on a previous time window.

In one embodiment, block 402 precedes block 404. Alternatively, block 404 may precede block 402.

The statistical parameter determination module 314 then determines parameters to evaluate based on each portion of the subset of packet delay values (block 406). The statistical parameter determination module then evaluates the parameters (block 408). As described earlier, the statistical parameter determination module 314 may evaluate at least one of the minimum, the mean, the median, the mode, the maximum. The parameters may also correspond to the positions of slopes, peaks, and troughs in the probability distribution function of the portion of the subset of packet delay values. In addition, the statistical parameter determination module 314 may evaluate at least one of the standard deviation, the variance, and the higher-order moments of each portion of the subset of packet delay values. The higher-order moments may correspond to the skew and/or the kurtosis. The standard deviation, the variance, and the higher-order moments are measures of the variability or dispersion of each portion of the subset of packet delay values. For example, a low standard deviation or variance may indicate that a portion of the subset of packet delay values has experienced little jitter due to the packet traffic 202, and also may indicate that the loading level of the packet traffic 202 is low. On the other hand, a high standard deviation or variance may indicate that the portion of the subset of packet delay values has experienced significant jitter due to packet traffic 202, and also may indicate that the loading level of the packet traffic 202 is high.

As described earlier, parameters such as the minimum, the mean, the median, the mode, and the maximum of each portion of the subset of packet delay values may be stable for time windows corresponding to different ranges of load values. For example, based on the ITU-T G.8261 test configuration described earlier, a parameter such as the minimum of a portion of packet delay values measured over 64 or 128 second intervals may be stable for time windows corresponding to load values less than 50-60%, but not for larger load values. On the other hand, a parameter such as the maximum of a portion of packet delay values measured over 64 or 128 second intervals may be stable for time windows corresponding to load values greater than 50-60%. Interestingly, the median of a portion of packet delay values measured over 64 or 128 second intervals may be stable for time windows corresponding to a greater range of load values than the minimum of the portion of packet delay values measured over the same time intervals.

In one embodiment, the statistical parameter determination module 314 determines which parameters are likely to be stable, and evaluates those parameters. The statistical parameter determination module 314 may determine, for each portion of the subset of packet delay values, to evaluate at least one of the minimum, the mean, the median, the mode, and the maximum and at least one of the standard deviation, the variance, and the higher-order moments. The standard deviation, the variance, and/or the higher-order moments may be used by the statistical parameter determination module 314 to select which of the minimum, the mean, the median, the mode, and the maximum to evaluate and/or to use. For example, a low standard deviation or variance may indicate that the minimum and/or the mean should be used instead of the maximum. Alternatively, a high standard deviation or variance may indicate that the maximum should be used instead of the minimum and/or the mean. The standard deviation variation or variance may also indicate that the mean should be used instead of, or in addition to, the minimum. The variance may be used as part of determination of weights, time window lengths, integration/observation times, and/or to independently set the control gain for frequency and phase corrections by the adjustment module 324.

In one embodiment, the network rearrangement detection module 318 detects a network rearrangement based on the parameters evaluated by the statistical parameter determination module 314 (block 410). A network rearrangement may result in the routing and/or switching of the timing packets 204 onto a different network path with different propagation delay characteristics, which may result in a sudden shift in the packet delay values associated with the timing packets 204. For example, the network rearrangement may result in a new, stable minimum, mean, or maximum that are outside of the range of normally expected drift of the client clock 211. This shift in the packet delay values may be detected by a shift (either up or down) in at least one of the minimum, the mean, the median, the mode, and the maximum, where the magnitude of the shift exceeds a minimum threshold. The minimum threshold may range from approximately 1 microsecond to approximately 10 microseconds depending on the application. This shift in the packet delay values may be a phase variation (or phase offset) that can be compensated for by the adjustment module 324. On the other hand, packet delay values may suddenly shift as a result of a change in loading of the packet traffic 202, which may significantly change the amount of jitter experienced by the timing packets 204. To distinguish a network rearrangement from a change in loading of the packet traffic 202, at least one of the standard deviation and the variance should be below a variation threshold for both a first portion of the packet delay values prior to the network rearrangement, and a second portion of the packet delay values after the network rearrangement. Depending upon the network configuration, variance values less than 20 microseconds may indicate that the shift in the packet delay values is not caused by a change in loading of the packet traffic 202.

The network rearrangement detection module 318 may inform the statistical parameter determination module 314 of a detected network rearrangement. For example, upon a signal from the network rearrangement detection module 318 that there has been a network rearrangement, the statistical parameter determination module 314 may re-determine parameters based on packet delay values measured after the network rearrangement.

The validation module 320 then validates parameters evaluated by the statistical parameter determination module 314 (block 412). The validation module 320 may validate a parameter evaluated based on a portion of the subset of packet delay values when the portion includes at least a minimum number of packet delay values. The minimum number of packet delay values may be in the range from one to sixteen inclusive. In one embodiment, the minimum number of packet delay values may be increased based on at least one of the standard deviation, the variance, and the higher-order moment of the portion of the subset of packet delay values. For example, if the standard deviation or the variance exceeds a variation threshold, then the minimum number of packet delay values may be decreased to one or increased to as many as the maximum number of delay values in the time window.

For some parameter types, the validation module 320 may validate the parameter based on additional criteria, such as when the parameter is the maximum of a portion of the subset of packet delay values associated with a first time window. The validation module 320 may check that the maximum is stable, e.g. within a tolerance of a maximum delay parameter. The maximum delay parameter may be set based on the maximum of a prior portion of the subset of packet delay values associated with a second time window. The second time window may be prior to the first time window and of longer length than the first time window. The tolerance may be less than approximately 3 microseconds (within ±3 microseconds). The validation module 320 may also check that a minimum number of timing packets 204 are detected as lost within the time window length associated with the portion of the subset of packet delay values. The reason for this check is that timing packet loss may indicate that buffers in the switching devices 200 are overflowing, which may indicate that the maximum will not increase farther. Timing packet loss may be determined by the timing packet loss determination module 322. For example, loss of a timing packet 204 may be determined based on a failure to receive any timing packet including an identifier within the first time window. The identifier may be a sequence number, and the sequence number may be stored in a field within the timing packet 204. In addition, packet loss can be determined from having received less than an expected number of timing packets within the time window.

To distinguish between timing packet loss due to bit errors and timing packet loss due to buffer overflows, the minimum number of timing packets lost may have a value greater than one, such as two, four, or eight. The minimum number of timing packets may also vary depending on the time window length over which the maximum is evaluated.

In one embodiment, the weight determination module 326 may apply weights to parameters evaluated by the statistical parameter determination module 314 (block 414). As described earlier, weights may be used by the adjustment module 324 to emphasize more reliable parameters over less reliable parameters. The adjustment module 324 may also exclude parameters with low weights, such as weights of zero. The adjustment module 324 may use the weight to exclude parameters corresponding to one or more portions of the packet delay values associated with a path, a direction, and/or a time window. The weighting may be determined based on parameters provided by the packet delay selection module 312, the statistical parameter determination module 314, and/or traffic loading estimates provided by traffic estimation module 328. For example, the weight applied to a parameter may be determined based on the selection percentage associated with the selection of the subset of packet delay values associated with the parameter, and/or at least one of the standard deviation, the variance, and the higher-order moments of the portion of the subset of packet delay values associated with the parameter.

The adjustment module 324 then compensates for at least one of the frequency variation and the phase variation of the client clock 211 based on validated parameters (block 416). The adjustment module may include a phase locked loop and/or a frequency locked loop, as is familiar to one of ordinary skill in the art. In one embodiment, the adjustment module 324 may determine the frequency variation of the client clock 211 relative to the clock master 110 based on a first parameter and a second parameter, where both are evaluated based on packet delay values 204 associated with a first path and an incoming direction (from the time server 100 to the client 201). The first parameter and the second parameter may be evaluated based on portions of the packet delay values 204 associated with a first time window and a second time window, respectively. The adjustment module 324 may then lock the frequency of the client clock 211 to the frequency of the clock master 110. However, without additional information, the adjustment module 324 may be unable to compensate for the phase variation (in this case, a constant phase offset) that may remain between the clock master 110 and the client clock 211.

The adjustment module 324 may determine the phase variation of the client clock 211 relative to the clock master 110, in addition to the frequency variation, by additionally taking into account a third parameter and a fourth parameter, where both are evaluated based on packet delay values 204 associated with the outgoing direction (from the client 201 to the time server 100) of the first path. The phase variation may be a phase offset associated with a network rearrangement detected by the network rearrangement detection module 318. The third parameter and the fourth parameter may be evaluated based on portions of the packet delay values 204 associated with the first time window and the second time window, respectively. If the length of the first path on the incoming direction is approximately equal to the length of the first path on the outgoing direction, then the adjustment module 324 may then substantially eliminate the constant phase offset between the clock master 110 and the client clock 211. On the other hand, if the length of the first path on the incoming direction is different from the length of the first path on the outgoing direction, then the adjustment module 324 may reduce but not eliminate the constant phase offset between the clock master 110 and the client clock 211

The adjustment module 324 may compensate for frequency variation but not for phase variation because of unequal traffic loading on the incoming and outgoing directions. For example, the weight determination module 326 may apply a first weight to a parameter when that parameter is used to compensate for frequency variation, and may apply a second, different weight to the parameter when the parameter is used to compensate for phase variation. For example, if the standard deviation or variance of the portion of packet delay values associated with a parameter is above a threshold, the first weight may be positive and the second weight may be zero. This indicates that the adjustment module 324 is using the parameter only to compensate for frequency variations. On the other hand, if the standard deviation or variance of the portion of packet delay values associated with a parameter is below the threshold, both the first and the second weights may be positive, indicating that the adjustment module 324 is using the parameter to compensate for both frequency and phase variations.

Figure 5:
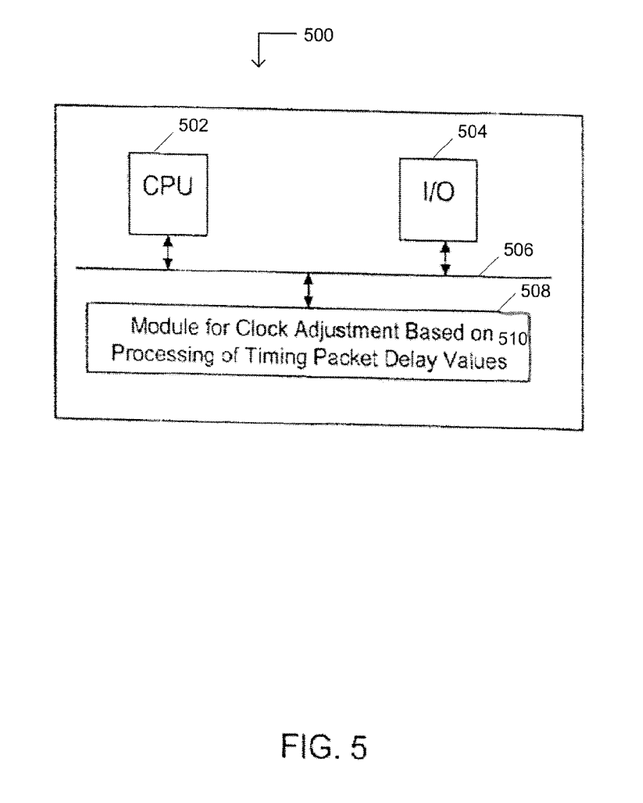
FIG. 5 illustrates an apparatus configured in accordance with one embodiment of the present invention.

FIG. 5 illustrates an apparatus 500 configured in accordance with one embodiment of the present invention. The apparatus 500 includes a central processing unit (CPU) 502 connected to a bus 506. Input/output devices 504 are also connected to the bus 506, and may include a keyboard, mouse, display, and the like. An executable program 510 representing the module 300 for clock adjustment based on processing of timing packet delay values is stored in memory 508. The operations of module 300 are described in FIGS. 3 and 4.

Figure 6:
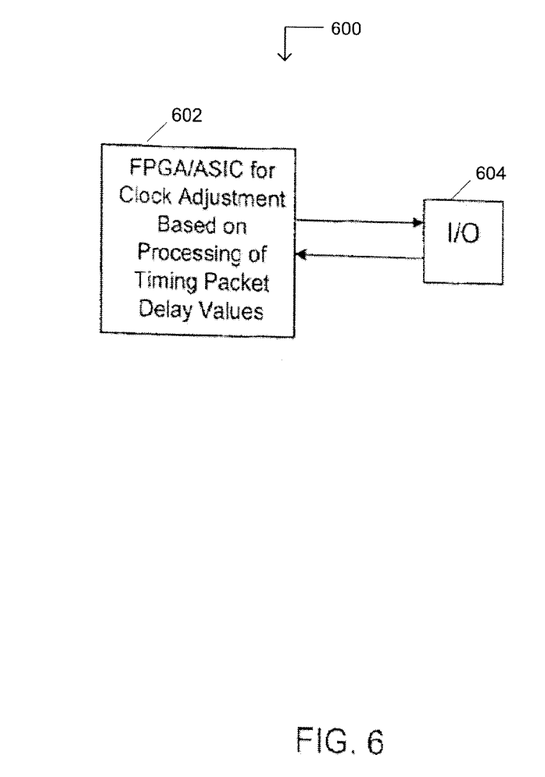
FIG. 6 illustrates an apparatus configured in accordance with another embodiment of the present invention.

FIG. 6 illustrates an apparatus 600 configured in accordance with another embodiment of the present invention. The apparatus 600 includes a field programmable gate array (FPGA) and/or an application specific integrated circuit (ASIC) 602 that implements the operations of module 300 for clock adjustment based on processing of timing packet delay values. The FPGA/ASIC 602 may be configured by and may provide output to input/output devices 604.

It will be understood by one of ordinary skill in the art that the embodiments described in this specification may distribute timing information using various forms of network traffic, including but not limited to packets. For example, the embodiments described in this specification may distribute timing information using cells or frames.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

From the foregoing, it can be seen that an apparatus and method for compensating for clock frequency and phase variations by processing packet delay values are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An apparatus, comprising:
a packet delay determination module configured to determine each of a plurality of packet delay values based on time values associated with a first electronic component and a second electronic component;
a packet delay selection module configured to select a subset of the plurality of packet delay values based on a maximum frequency drift of the first electronic component;
a statistical parameter determination module configured to evaluate a first parameter based on a first portion of the subset of packet delay values, and a second parameter based on a second portion of the subset of packet delay values;
a validation module configured to validate the first parameter and the second parameter when the first portion and the second portion of the subset of packet delay values each include a minimum number of packet delay values, the minimum number being at least two; and
an adjustment module configured to compensate for at least one of a frequency variation or a phase variation of the first electronic component based on the first parameter and the second parameter if the first parameter and the second parameter are both validated;
at least one of the packet delay determination module, the packet delay selection module, the statistical parameter determination module, the validation module, or the adjustment module being implemented in at least one of a memory or a processing device.

2. The apparatus of claim 1, wherein the maximum frequency drift of the first electronic component is within 250 parts per billion of a center frequency of the first electronic component.

3. The apparatus of claim 1, wherein the first parameter and the second parameter each corresponds to at least one of a minimum, a mean, a median, a mode, or a maximum.

4. The apparatus of claim 3, wherein the statistical parameter determination module is configured to evaluate a third parameter based on the first portion of the subset of packet delay values, and a fourth parameter based on the second portion of the subset of packet delay values, wherein the third parameter and the fourth parameter each corresponds to at least one of a standard deviation, a variance, or a higher-order moment.

5. The apparatus of claim 4, wherein the validation module is configured to increase the minimum number of packet delay values to at least four when at least one of the third parameter or the fourth parameter exceeds a first variation threshold.

6. The apparatus of claim 3, further comprising a traffic estimation module that is configured to determine a traffic load estimate of packet traffic causing a variation in the subset of packet delay values.

7. The apparatus of claim 3, wherein the adjustment module is configured to compensate for the frequency variation of the first electronic component, without being configured to substantially compensate for a phase offset included in the phase variation.

8. The apparatus of claim 7, wherein each of the subset of packet delay values is associated with an incoming direction, and is determined based on a first transmission time of the timing packet measured using the first electronic component, and a first reception time of the timing packet measured using the second electronic component.

9. The apparatus of claim 3, wherein the adjustment module is configured to compensate for both the frequency variation and the phase variation of the first electronic component.

10. The apparatus of claim 9, wherein:
the first portion of the subset of packet delay values is associated with an incoming direction and a first time window;
the second portion of the subset of packet delay values is associated with an outgoing direction and the first time window;
a third portion of the subset of packet delay values is associated with an incoming direction and a second time window; and
a fourth portion of the subset of packet delay values is associated with an outgoing direction and the second time window;
wherein the statistical parameter determination module is configured to evaluate the third parameter based on the third portion of the subset of packet delay values, and the fourth parameter based on the fourth portion of the subset of packet delay values; and
wherein the adjustment module is configured to compensate for both the frequency variation and the phase variation of the first electronic component based on the first parameter, the second parameter, the third parameter, and the fourth parameter if each of the four parameters is validated.

11. The apparatus of claim 4, wherein:
the first portion of the subset of packet delay values is associated with a first time window; and
the second portion of the subset of packet delay values is associated with a second time window.

12. The apparatus of claim 11, further comprising a time window determination module that is configured to determine a length of the first time window and a length of the second time window.

13. The apparatus of claim 12, wherein the time window determination module is configured to determine the length of the first time window and the length of the second time window based on at least one of a standard deviation, a variance, or a higher-order moment evaluated based on a third portion of the packet delay values.

14. The apparatus of claim 4, wherein the statistical parameter determination module is configured to evaluate a fifth parameter based on the first portion of the subset of packet delay values, wherein the fifth parameter corresponds to at least one of a minimum, a mean, a median, a mode, or a maximum, and is of a different type from the first parameter.

15. The apparatus of claim 14, wherein the statistical parameter determination module is configured to evaluate the fifth parameter when the third parameter exceeds a second variation threshold.

16. The apparatus of claim 14, wherein the first parameter is a mean and the fifth parameter is a median.

17. The apparatus of claim 4, further comprising a weight determination module that is configured to weight the first parameter and the second parameter, so that the adjustment module is configured to compensate for at least one of the frequency variation and the phase variation of the first electronic component based on weighted values of the first parameter and the second parameter.

18. The apparatus of claim 17, wherein the packet delay selection module is configured to determine a selection percentage based on a percentage of the plurality of packet delay values selected to be in the subset of the plurality of packet delay values.

19. The apparatus of claim 18, wherein the weight determination module is configured to:
determine a first weight applied to the first parameter based on at least one of the value of the third parameter or the selection percentage; and
determine a second weight applied to the second parameter based on at least one of the value of the fourth parameter or the selection percentage.

20. The apparatus of claim 19, wherein the adjustment module is not configured to use the first parameter when the first weight is zero.

21. The apparatus of claim 11, wherein:
the first parameter and the second parameter each corresponds to at least one of a minimum or a mean; and
the third parameter and the fourth parameter each corresponds to at least one of a standard deviation or a variance.

22. The apparatus of claim 21, further comprising a network rearrangement detection module that is configured to detect a network rearrangement when:
the third parameter and the fourth parameter are each below a third variation threshold; and
the second parameter is different from the first parameter by at least a minimum threshold.

23. The apparatus of claim 22, wherein the adjustment module is configured to compensate for the phase variation corresponding to a difference between the second parameter and the first parameter if the network rearrangement is detected.

24. An apparatus, comprising:
a packet delay determination module that is configured to determine each of a plurality of packet delay values based on time values associated with a first electronic component and a second electronic component;
a statistical parameter determination module that is configured to evaluate a first maximum of a first portion of the packet delay values, and a second maximum of a second portion of the packet delay values, each of the first portion and the second portion of the packet delay values being associated with a time window;
a timing packet loss detection module that is configured to detect a loss of a first timing packet including a first identifier based on failure to receive any timing packet including the first identifier within the time window;
a validation module that is configured to validate the first maximum and the second maximum when:
the first portion and the second portion of the subset of packet delay values each includes a minimum number of packet delay values, the minimum number of packet delay values being at least two;
each of the first maximum and the second maximum is within a tolerance of a maximum delay parameter; and
a minimum number of timing packets are detected as lost within the time window; and
an adjustment module that is configured to compensate for a frequency variation of the first electronic component based on the first parameter and the second parameter if the first maximum and the second maximum are both validated;

at least one of the packet delay determination module, the statistical parameter determination module, the timing packet loss detection module, the validation module, or the adjustment module being implemented in at least one of a memory or a processing device.

25. The apparatus of claim 24, wherein the first identifier is a sequence number.

26. The apparatus of claim 24, wherein the minimum number of timing packets is determined based on the length of the time window.

27. The apparatus of claim 24, wherein the minimum number of timing packets is at least two.

28. The apparatus of claim 24, wherein the maximum delay parameter is determined based on a third maximum of a third portion of the packet delay values.

29. The apparatus of claim 28, wherein the third portion of the packet delay values is associated with a time period prior to the time window and longer than the length of the time window.

30. The apparatus of claim 24, wherein the tolerance is less than a value of approximately 3 microseconds.

* * * * *